(12) United States Patent
Kim et al.

(10) Patent No.: US 10,946,516 B2
(45) Date of Patent: Mar. 16, 2021

(54) COMPUTED-TORQUE BASED CONTROLLER, PARAMETER DETERMINATION METHOD THEREOF AND PERFORMANCE ANALYSIS METHOD THEREOF

(71) Applicant: KOREA INSTITUTE OF SCIENCE AND TECHNOLOGY, Seoul (KR)

(72) Inventors: Jung Hoon Kim, Seoul (KR); Jaeyoung Park, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 255 days.

(21) Appl. No.: 16/168,048

(22) Filed: Oct. 23, 2018

(65) Prior Publication Data
US 2019/0321972 A1 Oct. 24, 2019

(30) Foreign Application Priority Data
Apr. 19, 2018 (KR) .................. 10-2018-0045509

(51) Int. Cl.
*B25J 9/16* (2006.01)
(52) U.S. Cl.
CPC ............ *B25J 9/163* (2013.01); *B25J 9/1605* (2013.01); *G05B 2219/39001* (2013.01); *G05B 2219/42004* (2013.01)
(58) Field of Classification Search
None
See application file for complete search history.

(56) References Cited

U.S. PATENT DOCUMENTS

| 7,355,364 B2 * | 4/2008 | Gonzalez-Banos | B25J 9/1628 318/568.22 |
| 7,363,094 B2 * | 4/2008 | Kumar | G05B 11/32 700/29 |
| 8,924,021 B2 * | 12/2014 | Dariush | G06N 3/008 700/262 |

(Continued)

FOREIGN PATENT DOCUMENTS

KR 10-2017-0119197 A 10/2017

OTHER PUBLICATIONS

Jung Hoon Kim et al., A Study on the L1 Optimal PD Controller with Application to Joint Motion Control of a Robot Manipulator, May 16-21, 2016; International Conference on Robotics and Automation (ICRA), pp. 5696-5701 (Year: 2016).*

(Continued)

*Primary Examiner* — Jeff A Burke
*Assistant Examiner* — Zachary Joseph Wallace
(74) *Attorney, Agent, or Firm* — Rabin & Berdo, P.C.

(57) ABSTRACT

Provided is a controller of a robot manipulator, a performance analysis method thereof and a parameter determination method thereof. The controller computes an error value of an output value of a control target for a target value through a computational equation and provides a control input value of the control target, and includes an outer loop controller which constitutes closed loop control of the control target, and an inner loop controller which performs feedback linearization to remove nonlinearity of the control target, wherein the computational equation is a linear differential equation designed considering exogenous disturbance acting in the controller and a computational error.

5 Claims, 14 Drawing Sheets

(56) References Cited

U.S. PATENT DOCUMENTS

| | | |
|---|---|---|
| 2010/0168919 A1 | 7/2010 | Okamoto |
| 2014/0081461 A1 | 3/2014 | Williamson et al. |
| 2017/0000577 A1 | 1/2017 | Bowling et al. |
| 2018/0169864 A1* | 6/2018 | Haddadin .............. B25J 9/1653 |

OTHER PUBLICATIONS

Xia Liu et al.; Composite Control of Nonlinear Robotic System with Exogenous Disturbance; Jan. 30, 2019; IEEE Access ; vol. 7, pp. 19564-19571 (Year: 2019).*

Canberk Suat Gurel, "Computed Torque Control of a Medical Parallel Manipulator", University of Maryland, 2017.

Tolgay Kara et al., "State Feedback Switching Control of an Underactuated Planar Manipulator with Partial Feedback Linearization", Süleyman Demirel University, Journal of Natural and Applied Sciences, 2017, vol. 21, Issue 3, pp. 703-710.

C.H. An et al., "Experimental Evaluation of Feedforward and Computed Torque Control", IEEE Transactions on Robotics and Automation, Jun. 1989, pp. 368-373, vol. 5, No. 3.

Pradeep K. Kholsa et al., "Real-Time Implementation and Evaluation of Computed-Torque Scheme", IEEE Transactions on Robotics and Automation, Apr. 1989, pp. 245-253, vol. 5, No. 2.

* cited by examiner $(k_p, k_d) = (30, 10)$ $(k_p, k_d) = (70, 15)$ $(k_p, k_d) = (90, 10)$ $(k_p, k_d) = (80, 20)$ $(k_p, k_d) = (120, 20)$ $(k_p, k_d) = (200, 20)$ $(k_p, k_d) = (400, 30)$ $(k_p, k_d) = (800, 40)$

COMPUTED-TORQUE BASED CONTROLLER, PARAMETER DETERMINATION METHOD THEREOF AND PERFORMANCE ANALYSIS METHOD THEREOF

CROSS-REFERENCE TO RELATED APPLICATION

This application claims priority to Korean Patent Application No. 10-2018-0045509, filed on Apr. 19, 2018, and all the benefits accruing therefrom under 35 U.S.C. § 119, the contents of which in its entirety are herein incorporated by reference.

BACKGROUND

1. Field

The present disclosure relates to a computed torque based controller of a robot manipulator, a performance analysis method of the controller and a parameter determination method of the controller, and more particularly, to the design of a computed torque based controller considering exogenous disturbance and a modeling error, and a performance analysis method thereof and a parameter determination method thereof.

2. Description of the Related Art

With the fast movement towards larger scale, precision and automation of industry, robot manipulators are now indispensable in the industrial field. The robot manipulators used in the industrial field come in various types and have a wide range of applications from simple robots made up of links to welding, painting and precise component assembly.

In general, robot manipulator control addresses the issues of system stability by position control, trajectory tracking and exogenous disturbance removal. That is, a controller of a manipulator computes a control input necessary for tracking a target trajectory with minimizing the influence by exogenous disturbances derived from unmodeled dynamics such as frictions or noises. Additionally, because a robot is a system with very strong nonlinearity, it is not easy to precisely control, and accordingly, it is very important to determine a control algorithm that is suited for the purpose and a suitable parameter, and to this end, criteria for objectively evaluating the designed performance of the controller are needed.

SUMMARY

The present disclosure is designed to solve the above-described problem, and therefore the present disclosure is directed to providing a computed torque based controller with improved control performance by proportional-derivative (PD) control combined with a feedback linearization technique including a dynamic property in control input to remove nonlinearity, while considering a modeling error and exogenous disturbance, and a parameter determination method of the controller.

Additionally, the inventors provide a performance analysis method of a controller as a criterion in adjusting and designing the control parameter of the controller.

A controller computes an error value of a target value and an output value of a control target according to an embodiment of the present disclosure through a computational equation and provides a control input value of the control target, and the controller includes an outer loop controller configured to improve the performance of the control target, and an inner loop controller which performs feedback linearization to remove nonlinearity of the control target, wherein torque of the control target is represented by the following Equation 1 including an exogenous disturbance torque vector, and the inner loop controller and the control target form an inner loop system, and a dynamics equation for an trajectory tracking error of the inner loop system is represented by the following Equation 4:

$$M(q)\ddot{q}+C(q,\dot{q})\dot{q}+G(q)+\tau_d=\tau \quad \text{[Equation 1]}$$

where $q(t) \in \mathbb{R}^n$ is the output value and corresponds to the joint angle vector, $M(q) \in \mathbb{R}^{n \times n}$ corresponds to the positive definite matrix corresponding to Inertia, $C(q,\dot{q})\dot{q} \in \mathbb{R}^n$ corresponds to the Coriolis and centrifugal torque vector, $G(q) \in \mathbb{R}^n$ corresponds to the gravitational torque vector, $\tau_d(t) \in \mathbb{R}^n$ corresponds to the exogenous disturbance torque vector, $\tau(t) \in \mathbb{R}^n$ corresponds to the control input torque vector, $$\ddot{e}=w+u \quad \text{[Equation 4]}$$

where $w:=-M^{-1}(q)\tilde{M}(q)(\ddot{q}_d-u)-M^{-1}(q)*\tilde{C}(q,\dot{q})\dot{q}+\tilde{G}(q)-\tau_d)$ is the total exogenous disturbance acting in the inner loop system, and is defined as including both the exogenous disturbance torque vector and the computational error, u is the control input value that is provided to the inner loop system by the outer loop controller.

In an embodiment, the inner loop system may be represented by a generalized linear model of a continuous-time linear time-invariant system as shown in the following Equation 7, the outer loop controller may perform proportional-derivative control as shown in the following Equation 8, and the closed loop system implemented by the controller may be represented by the following Equation 9:

$$P: \begin{cases} \dot{x} = Ax + Bw + Bu \\ z = Cx \\ y = x \end{cases} \quad \text{[Equation 7]}$$

where $$A \approx \begin{bmatrix} 0 & I \\ 0 & 0 \end{bmatrix},$$

$$B \approx \begin{bmatrix} 0 \\ I \end{bmatrix},$$

$$C \approx [C_p \ C_d],$$

$$x \approx [e^T \ \dot{e}^T]^T,$$

y denotes the measured output, and z denotes the regulated output, $$u = Ky = Kx = K\begin{bmatrix} e \\ \dot{e} \end{bmatrix} = :-[K_p \ K_d]\begin{bmatrix} e \\ \dot{e} \end{bmatrix} \quad \text{[Equation 8]}$$

$$P_K: \begin{cases} \dot{x} = A_K x + Bw \\ z = Cx \end{cases} \quad \text{[Equation 9]}$$

where $A_K:=A+BK$, is the outer loop control parameter.

In an embodiment, when the total exogenous disturbance w has finite energy, as the $L_\infty/L_2$ induced norm of the closed loop system increases, the $L_\infty$ norm $\|z\|_\infty$ of the regulated output z also increases. On the contrary, as the $L_\infty/L_2$ induced norm of the closed loop system reduces, the $L_\infty$ norm $\|z\|_\infty$ of the regulated output z also reduces. That is, they have a positive correlation.

In an embodiment, the $L_\infty/L_2$ induced norm of the closed loop system may be computed by the following Equation 16:

$$\|T\|_{\infty/2} = \max_{1 \le i \le n}(C_i P C_i^T) = d_{max}^{1/2}(CPC^T) \quad \text{[Equation 16]}$$

where P is a solution of $A_K P + P A_K^T + BB^T = 0$.

A parameter determination method of a controller according to an embodiment of the present disclosure is a parameter determination method of a controller that computes an error value of an output value of a control target for a target value through a computational equation and provides a control input value of the control target, and includes computing $L_\infty/L_2$ induced norm of a control system formed by the controller and the control target through initially set control parameter, comparing the computed $L_\infty/L_2$ induced norm with a reference value, and when the computed $L_\infty/L_2$ induced norm is larger than the reference value, adjusting the control parameter to reduce the computed $L_\infty/L_2$ induced norm.

In an embodiment, the controller may form a closed loop system $P_K$ as shown in the following Equation 9:

$$P_K : \begin{cases} \dot{x} = A_K x + Bw \\ z = Cx \end{cases} \quad \text{[Equation 9]}$$

where $A_K \approx A + BK$, $A \approx \begin{bmatrix} 0 & I \\ 0 & 0 \end{bmatrix}$, $B \approx \begin{bmatrix} 0 \\ I \end{bmatrix}$, $C \approx [C_p \; C_d]$, $x \approx [e^T \; \dot{e}^T]^T$, denotes the control parameter, $w := -M^{-1}(q)\tilde{M}(q)(\ddot{q}_d - u) - M^{-1}(q)*\tilde{C}(q,\dot{q})\dot{q} + \tilde{G}(q) - \tau_d)$ is the total exogenous disturbance acting in the inner loop system and is defined as including both an exogenous disturbance torque vector and a computation error, and z denotes the regulated output.

In an embodiment, when the total exogenous disturbance w has finite energy, the $L_\infty/L_2$ induced norm of the closed loop system may be computed through a performance analysis mathematical expression $d_{max}^{1/2}(CPC^T)$ where P is a solution of $A_K P + P A_K^T + BB^T = 0$.

In an embodiment, the $L_\infty/L_2$ induced norm of the closed loop system and the $L_\infty$ norm $\|x\|_\infty$ of the regulated output z may have a positive correlation.

A performance analysis method of a controller according to an embodiment of the present disclosure is a performance analysis method of a controller that computes an error value of an output value of a control target for a target value through a computational equation and provides a control input value of the control target, and includes the controller forming a closed loop system $P_K$ as shown in the following Equation 9, and computing $L_\infty/L_2$ induced norm of the closed loop system through a performance analysis mathematical expression $d_{max}^{1/2}(CPC^T)$:

$$P_K : \begin{cases} \dot{x} = A_K x + Bw \\ z = Cx \end{cases} \quad \text{[Equation 9]}$$

where $A_K \approx A + BK$, $A \approx \begin{bmatrix} 0 & I \\ 0 & 0 \end{bmatrix}$, $B \approx \begin{bmatrix} 0 \\ I \end{bmatrix}$, $C \approx [C_p \; C_d]$, $x \approx [e^T \; \dot{e}^T]^T$, K is the control parameter, $w := -M^{-1}(q)\tilde{M}(q)(\ddot{q}_d - u) - M^{-1}(q)*\tilde{C}(q,\dot{q})\dot{q} + \tilde{G}(q) - \tau_d)$ is the total exogenous disturbance acting in the inner loop system and is defined as including both an exogenous disturbance torque vector and a computational error, z denotes the regulated output, and P is a solution of $A_K P + P A_K^T + BB^T = 0$.

The controller according to this embodiment controls a control target by proportional-derivative (PD) control combined with a feedback linearization technique including a dynamic property of the control target in input value to remove nonlinearity, thereby controlling the control target more accurately and effectively.

Additionally, the control parameter K is set, taking into account the relation between the total exogenous disturbance w considering both an exogenous disturbance torque vector and a modeling error and a regulated output value z represented as a trajectory tracking error $[e^T \dot{e}^T]$, and the control parameter may be determined to reduce an trajectory tracking error as much as desired through a new analysis method for analyzing the quantitative control performance of the controller.

DETAILED DESCRIPTION

The following detailed description of the present disclosure is made with reference to the accompanying drawings, in which particular embodiments for practicing the present disclosure are shown for illustration purposes. These embodiments are described in sufficiently detail for those skilled in the art to practice the present disclosure. The terms as used herein are general terms selected as those being now used as widely as possible in consideration of functions, but they may vary depending on the intention of those skilled in the art or the convention or the emergence of new technology. Additionally, in certain cases, there may be terms arbitrarily selected by the applicant, and in this case, the meaning will be described in the corresponding description part of the specification. Accordingly, the terms as used herein should be interpreted based on the substantial meaning of the terms and the content throughout the specification, rather than simply the name of the terms.

The controller according to the embodiments may have aspects of entirely hardware, entirely software, or partially hardware and partially software. For example, each "unit" that constitutes the controller as used herein may collectively indicate hardware and operating software that enables the hardware to operate. Furthermore, hardware may be a data processing device including a computer processing unit (CPU) or other processor. Furthermore, software operated by hardware may indicate a process being executed, an object, an executable, a thread of execution, and a program.

In the specification, "$\mathbb{R}^v$" refers to a set of v-dimensional real numbers.

In the specification, "$d_{max}(\bullet)$" refers to a maximum diagonal entry.

In the specification, "$\|\bullet\|_2$" and "$\|\bullet\|_\infty$" refer to $L_2$ norm and $L_\infty$ norm of a vector function respectively.

In the specification, "$\|\bullet\|_{\infty/2}$" refers to a norm induced from $L_2$ to $L_\infty$ by a system or an operator.

Figure 1:
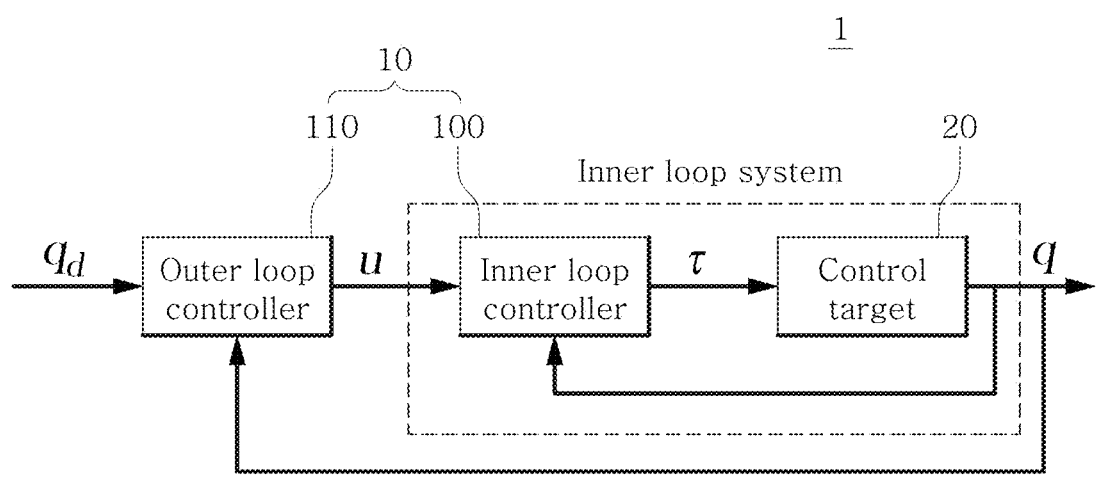
FIG. 1 is a block diagram of a control system according to an embodiment of the present disclosure.
Figure 2:
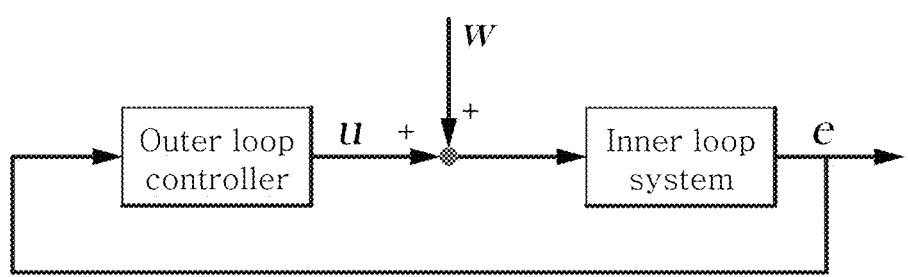
FIG. 2 is a block diagram of a controller according to a dynamics equation that derives a trajectory tracking error as an output value.

FIG. 1 is a block diagram of a control system 1 according to an embodiment of the present disclosure. FIG. 2 is a block diagram of a controller according to a dynamics equation that derives a trajectory tracking error as an output value.

The control system 1 according to this embodiment may have aspects of entirely hardware, or partly hardware and partly software. That is, the control system and elements included therein may include devices for storing data of particular format and content or transmitting and receiving data via electronic communication and their related software. The hardware may be a data processing device including Central Processing Unit (CPU) or other processor. Additionally, the software that runs by the hardware may refer to a process in execution, an object, an executable, a thread of execution and a program.

As shown in FIG. 1, the control system 1 according to this embodiment includes a controller 10 to compute an error value of an output value (a tracking motion trajectory q) of a control target 20 for a value $q_d$ corresponding to a target motion trajectory through a preset computational equation and provide a control input value T of the control target 20. The controller 10 may be based on computed torque. Here, the control target 20 may be a robot manipulator, but is not limited thereto.

The controller 10 according to this embodiment may include an inner loop controller 100 and an outer loop controller 110. Each of the inner loop controller 100 and the outer loop controller 110 may receive feedback of an output value q of the control target 20. The inner loop controller 100 may linearize the nonlinear dynamic property of the control target 20, and form an inner loop system. The outer loop controller 110 forms the entire closed loop system with the control target 20, and may control to stabilize it and satisfy trajectory tracking. The controller 10 according to an embodiment of the present disclosure may control the control target 20 by proportional-derivative (PD) control combed with a feedback linearization technique including the dynamic property in the control input to remove nonlinearity.

The outer loop controller 110 may have inputs of the input value $q_d$ corresponding to the target motion trajectory and the output value q representing the real motion. The outer loop controller 110 may be a proportional-derivative (PD) controller that performs proportional computation of an error value e corresponding to a difference between the target value $q_d$ and the output value q and derivative computation of the error value, and may provide the control output value u to the inner loop controller 100.

The inner loop controller 100 may have inputs of the control output value u of the outer loop controller 110 and the output value q of the control target 20. The inner loop controller 100 may form a linearized inner loop system with the control target 20 to remove nonlinearity of the control target 20. The linearized inner loop system according to an embodiment of the present disclosure may be computed by the following process.

The dynamics equation of the control target 20 is represented by the following Equation 1.

$$M(q)\ddot{q}+C(q,\dot{q})\dot{q}+G(q)+\tau_d=\tau \quad \text{[Equation 1]}$$

(where $q(t) \in \mathbb{R}^n$ is the output value and corresponds to the joint angle vector, $M(q) \in \mathbb{R}^{n \times n}$ is the positive definite matrix corresponding to Inertia, $C(q,\dot{q})\dot{q} \in \mathbb{R}^n$ is the Coriolis and centrifugal torque vector, $G(q) \in \mathbb{R}^n$ is the gravitational torque vector, $\tau_d(t) \in \mathbb{R}^n$ is the exogenous disturbance torque vector, and $\tau(t) \in \mathbb{R}^n$ is the torque vector that is inputted in the control target and corresponds to the control input value.)

The torque of the control target may be represented by the above Equation 1 including the exogenous disturbance torque vector. Here, the exogenous disturbance torque vector $\tau_d(t)$ may act in the inner loop system formed by the control target 20 and the inner loop controller 100. Accordingly, the target motion trajectory $[q_d^T(t) \; \dot{q}_d^T(t)] \in \mathbb{R}^{2n}$ of the control target 20 and the tracking motion trajectory $[q_d^T(t) \; \dot{q}^T(t)]^T$ representing the real motion may have a trajectory tracking error $[e^T \; \dot{e}^T]$. The inner loop controller 100 may be designed as shown in the following Equation 2 to deal with the issues of linearization of the inner loop system and trajectory tracking more easily.

$$\tau=\hat{M}(q)(\ddot{q}_d-u)+\hat{C}(q,\dot{q})\dot{q}+\hat{G}(q) \quad \text{[Equation 2]}$$

(where ($\hat{\bullet}$) denotes a nominal value of ($\bullet$).)

When substituting Equation 2 into Equation 1, Equation 3 is induced as below.

$$\tilde{q} = M^{-1}(q)\tilde{M}(q)(\ddot{q}_d - u) + \quad \text{[Equation 3]}$$
$$M^{-1}(q)(\tilde{C}(q,\dot{q})\dot{q} + \tilde{G}(q) - \tau_d)$$

-continued
$$= \tilde{q}_d - u + M^{-1}(q)\tilde{M}(q)(\ddot{q}_d - u) + M^{-1}(q)(\tilde{C}(q,\dot{q})\dot{q} + \tilde{G}(q) - \tau_d)$$

Here, $\tilde{M}(q):=\hat{M}(q)-M(q)$, $\tilde{C}(q,\dot{q}):=\hat{C}(q,\dot{q})-C(q,\dot{q})$ and $\tilde{G}(q):=\hat{G}(q)-G(q)$ denote the modeling error and the nominal error occurring in the inner loop controller 100.

When a difference between the target motion trajectory $q_d$ and the tracking motion trajectory q is defined as a trajectory tracking error e, $e:=q_d-q$, the dynamics equation of the trajectory tracking error of the inner loop system from the above Equation 3 may be induced as shown in the following Equation 4. As shown in FIG. 2, the inner loop system may be represented by a dynamics equation that derives the trajectory tracking error e as the output value according to the input value w, u.

$$\ddot{e} = w + u \qquad \text{[Equation 4]}$$

Here, $w:=-M^{-1}(q)\tilde{M}(q)(\ddot{q}_d-u)-M^{-1}(q)*\tilde{C}(q,\dot{q})\dot{q}+\tilde{G}(q)-\tau_d)$ is the total disturbance acting in the inner loop system, and may be defined as including both the exogenous disturbance torque vector and the computational error (nominal error). As described above, u is the control output value provided by the outer loop controller 110. The above Equation 4 may be transformed as shown in the following Equation 5.

$$\frac{d}{dt}\begin{bmatrix} e \\ \dot{e} \end{bmatrix} = \begin{bmatrix} 0 & I \\ 0 & 0 \end{bmatrix}\begin{bmatrix} e \\ \dot{e} \end{bmatrix} + \begin{bmatrix} 0 \\ I \end{bmatrix}w + \begin{bmatrix} 0 \\ I \end{bmatrix}u \qquad \text{[Equation 5]}$$

Additionally, the regulated output may be defined according to the target performance specification for trajectory tracking. The regulated output z is represented as a function of the trajectory tracking error $[e^T \; \dot{e}^T]$ as shown in the following Equation 6:

$$z := C_p e + C_d \dot{e} \qquad \text{[Equation 6]}$$

(where $C_p$ and $C_d$ correspond to a constant matrix selected by a user.)

Additionally, when it is assumed that the trajectory tracking error e and $\dot{e}$ is a numerical value which can be immediately measured, the generalized linear model P of the continuous-time linear time-invariant system (LTI) of the inner loop system may be defined by combining Equation 5 with Equation 6 as shown in the following Equation 7:

$$P : \begin{cases} \dot{x} = Ax + Bw + Bu \\ z = Cx \\ y = x \end{cases} \qquad \text{[Equation 7]}$$

(where $$A \approx \begin{bmatrix} 0 & I \\ 0 & 0 \end{bmatrix},$$

$$B \approx \begin{bmatrix} 0 \\ I \end{bmatrix},$$

$$C \approx [C_p \; C_d],$$

$$x \approx [e^T \; \dot{e}^T]^T,$$

y denotes the measured output.)

The outer loop controller 110 performs proportional-derivative control as shown in the following Equation 8, and the control system 1 includes the entire closed loop system $P_k$, and this may be defined as shown in the following Equation 9:

$$u = Ky = Kx = K\begin{bmatrix} e \\ \dot{e} \end{bmatrix} = -[K_p \; K_d]\begin{bmatrix} e \\ \dot{e} \end{bmatrix} \qquad \text{[Equation 8]}$$

$$P_K : \begin{cases} \dot{x} = A_K x + Bw \\ z = Cx \end{cases} \qquad \text{[Equation 9]}$$

(where $A_K := A+BK$, K is the control parameter)

The controller 10 is based on computed torque to compute the error value e of the output value q of the control target 20 for the target value $q_d$ through the preset computational equation and provide the control input value τ of the control target 20 in which K corresponds to the control parameter of the controller 10, and precision and accuracy of trajectory tracking may be determined by the control parameter.

The control parameter K of the controller 10 according to this embodiment may be designed taking into account the total exogenous disturbance w considering both the exogenous disturbance torque vector and the modeling error (nominal error). To this end, the present disclosure proposes a new analysis method for analyzing the quantitative control performance of the controller 10. The control parameter K may be designed through the results of the new analysis method, and this may coincide with the direction of reducing the trajectory tracking error defined by the control system 1. Hereinafter, the performance analysis method of the controller 10 according to an embodiment of the present disclosure will be described.

The performance analysis mathematical expression of the performance analysis method of the controller 10 according to an embodiment of the present disclosure may have the form of $L_\infty/L_2$ induced norm of the control system. In the performance analysis method of the controller that computes an error value of an output value of a control target for a target value through a computational equation and provides a control input value of a control target, the controller forms a closed loop system, and may compute the $L_\infty/L_2$ induced norm of the closed loop system through a performance analysis mathematical expression $d_{max}^{1/2}(CPC^T)$. It is possible to objectively determine the performance of the controller 10 configured at the present time by comparing the computed $L_\infty/L_2$ induced norm value with a reference value.

The performance analysis mathematical expression according to this embodiment represents the standard performance from the viewpoint of limitations of time domain rather than limitations of frequency domain, and may be substantially more useful analysis index. Hereinafter, the process of inducing the $L_\infty/L_2$ induced norm of the control system by the performance analysis mathematical expression $d_{max}^{1/2}(CPC^T)$ will be described.

The control system 1 is a closed loop system, and it is assumed that the total exogenous disturbance w acting in it has finite energy. That is, $L_2$ norm of the exogenous disturbance w is defined as shown in Equation 10, and may have a value that is equal to or less than a predetermined constant $\gamma_2$.

$$\|w\|_2 = (\int_0^\infty |w(t)|_2^2 dt)^{1/2} \leq \gamma_2 < \infty \qquad \text{[Equation 10]}$$

Additionally, it is further assumed that $A_K$ has all eigenvalues in the left-half-plane LHP, and the input-output properties of the closed loop system $P_k$ may be defined in the form of convolution integral such as the following Equation 11:

$$z(t) = \int_0^t C\exp(A_K(t-\tau))Bw(\tau)d\tau \qquad \text{[Equation 11]}$$
$$= :(Tw)(t)(0 \leq t < \infty)$$

T is an operator showing the input-output properties of the control system. When considering that $(T_w(t)$ is a continuous function and T corresponds to the linear operator, $\|T\|_{\infty/2}$ ($L_\infty/L_2$ induced norm) may be defined as the following Equation 12:

$$\|T\|_{\infty/2} \approx \sup_{\|w\|_2 \leq 1} \|Tw\|_\infty \qquad \text{[Equation 12]}$$
$$= \sup_{\|w\|_2 \leq 1} \sup_t |Tw(t)|_\infty$$
$$= \sup_t \sup_{\|w\|_2 \leq 1} \left|\int_0^t C\exp(A_K(t-\tau))Bw(\tau)d\tau\right|_\infty$$
$$= \lim_{t\to\infty} \sup_{\|w\|_2 \leq 1} \left|\int_0^t C\exp(A_K(t-\tau))Bw(\tau)d\tau\right|_\infty$$
$$= \sup_{\|w\|_2 \leq 1} \left|\int_0^t C\exp(A_K\tau)Bw(\tau)d\tau\right|_\infty$$

When applying the continuous-time Cauchy-Schwarz inequality to Equation 12, $\|T\|_{\infty/2}$ may be defined as shown in Equation 14 according to the following Equation 13.

$$\left(\int_0^\infty C_i \exp(A_K\tau)Bw(\tau)d\tau\right)^2 \leq \|B^T \exp(A_K^T\tau)C_i^T\|_2^2 \cdot \|w(\tau)\|_2^2 \qquad \text{[Equation 13]}$$

$$\|T\|_{\infty/2} = \max_{1 \leq i \leq n} \left(\int_0^\infty C_i \exp(A_K\tau)BB^T \exp(A_K^T\tau)C_i^T d\tau\right)^{1/2} \qquad \text{[Equation 14]}$$

Here, $C_i$ is the $i^{th}$ row of C, the solution P of the integral equation on the right side of Equation 14 may be computed through the continuous-time Lyapunov equation such as the following Equation 15, and conclusion may be derived as shown in the following Equation 16:

$$A_K P + PA_K^T + BB^T = 0 \qquad \text{[Equation 15]}$$

$$\|T\|_{\infty/2} = \max_{1 \leq i \leq n} (C_i P C_i^T) = d_{max}^{1/2}(CPC^T) \qquad \text{[Equation 16]}$$

That is, $\|T\|_{\infty/2}$ ($L_\infty/L_2$ induced norm) may be computed by the performance analysis mathematical expression $d_{max}^{1/2}$ ($CPC^T$). Here, the computed solution may change depending on the parameter K. The quantitative performance of the computed torque based on controller considering exogenous disturbances may be defined by the $L_\infty/L_2$ induced norm, and the $L_\infty$ norm $\|x\|_\infty$ of the regulated output z may be concluded as shown in the following Equation 17:

$$\|z\|_\infty \leq \|T\|_{\infty/2} \cdot \gamma_2 = d_{max}^{1/2}(CPC^T) \cdot \gamma_2 \qquad \text{[Equation 17]}$$

As the $L_\infty/L_2$ induced norm reduces, the $L_\infty$ norm $\|z\|_\infty$ of the regulated output may also reduce, and this signifies that the design of parameters to reduce the $L_\infty/L_2$ induced norm may reduce the trajectory tracking error.

The following description is the results of experiments about effectiveness of the performance analysis mathematical expression of the controller and influences of computation values of analysis mathematical expression on the performance control of the controller.

Figure 3:
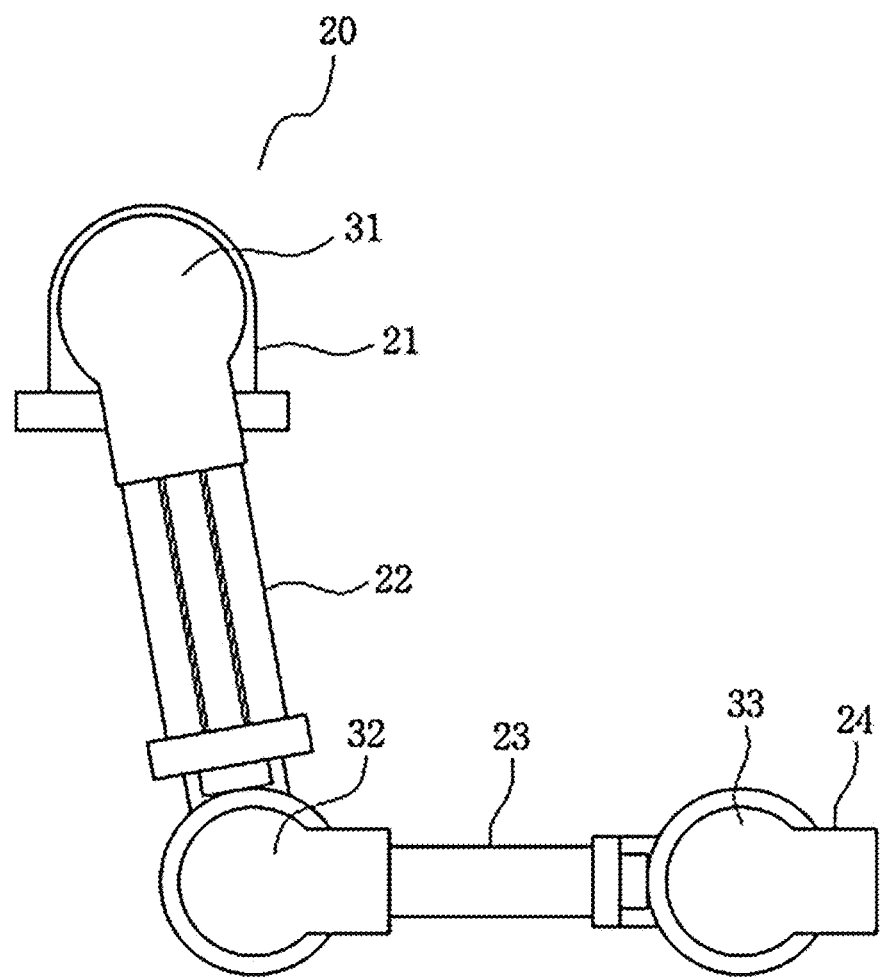
FIG. 3 schematically shows a robot manipulator to be controlled by a control system according to this embodiment.
Figure 4:
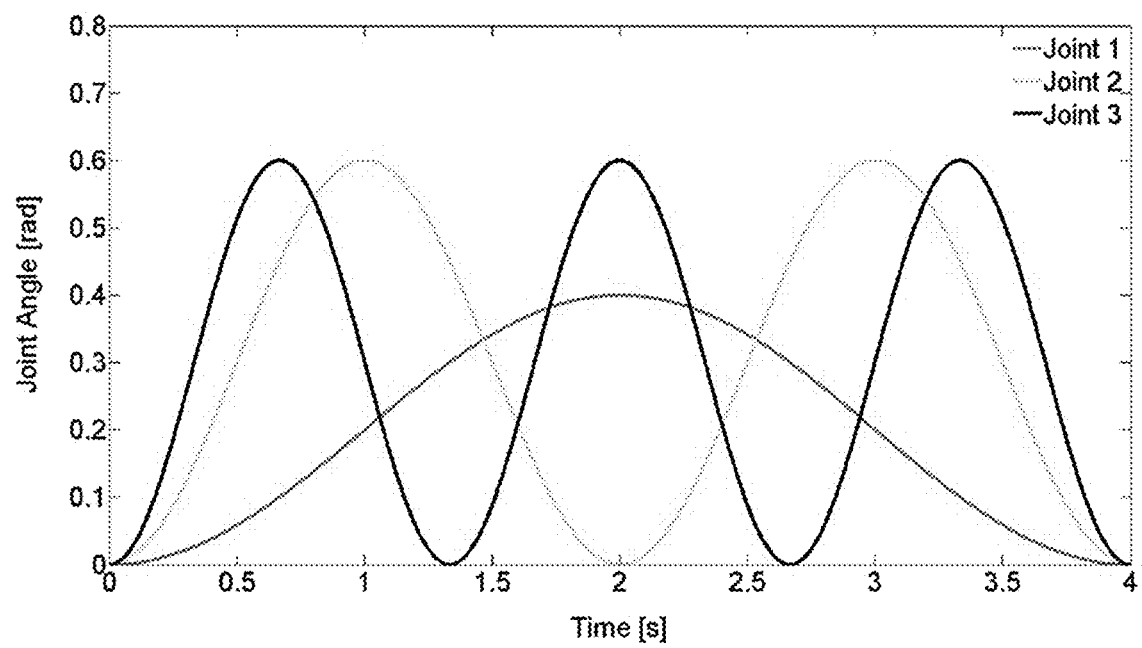
FIG. 4 shows a target motion trajectory commanding a motion of a robot manipulator.

FIG. 3 schematically shows the robot (robot manipulator) 20 to be controlled by the control system 1 according to this embodiment. FIG. 4 shows the target motion trajectory commanding the motion of the robot manipulator. FIGS. 5A-5H is a graph showing a comparison between the target motion trajectory $[q_d^T(t)\ \dot{q}_d^T(t)] \in \mathbb{R}^{2n}$ for each parameter $K_p$, $K_d$ and the tracking motion $[q^T(d)\ \dot{q}^T(t)]^T$ trajectory representing the real motion.

Referring to FIGS. 3 to 5H, the robot manipulator 20 is an example of a general mechanical system, may have a serial structure with 3-degrees of freedom (3-DoF) and is influenced by the gravity. Specifically, the 3-DoF serial robot manipulator 20 has a shape of an arm with three links 22, 23, 24 extending in a line from a base 21, and three joints 31, 32, 33 have brush-less direct current motors to rotate the corresponding link. The robot manipulator shown in FIG. 3 has three links 22, 23, 24, and each is 0.3 m, 0.3 m, 0.1 m long. The motor provided in Joint 1 31 has the output of 19.3 Nm, and the motor provided in each of Joint 2 32 and Joint 3 33 has the output of 13.5 Nm.

FIG. 4 shows the target motion trajectory commanding the motion of the robot manipulator.

The target motion trajectory $[q_d^T(t)\ \bar{q}_d^T(t)] \in \mathbb{R}^{2n}$ is set such that the joint angle and joint velocity are 0 when t=0 s, 4 s, and the total execution time of the target motion trajectory is 4 s. The outer loop controller 110 may perform PD control as shown in the above Equation 8, and the control parameter K is defined by a positive definite matrix as below:

$$K_p = \begin{bmatrix} k_p & 0 & 0 \\ 0 & k_p & 0 \\ 0 & 0 & k_p \end{bmatrix},$$

$$K_d = \begin{bmatrix} k_d & 0 & 0 \\ 0 & k_d & 0 \\ 0 & 0 & k_d \end{bmatrix}$$

To demonstrate the effect of the $L_\infty/L_2$ induced norm as performance measurement means of the controller 10, the $L_\infty/L_2$ induced norm is computed by changing the control parameter $K_p$, $K_d$ as below:

$(k_p, k_d) = (30,10),(70,15),(90,10),(80,20),(120,20),$
$(200,20),(400,30),(800,40)$

The $L_\infty/L_2$ induced norm as a function of the control parameter $K_p$, $K_d$ may be computed through the above Equation 16.

Additionally, the trajectory tracking error as a function of the control parameter $K_p$, $K_d$ is measured, and the regulated output z=Cx as a function of the control parameter $K_p$, $K_d$ is computed by applying the following output parameter C.

$$C = [C_p \ C_d] = \begin{bmatrix} 15 & 0 & 0 & 1 & 0 & 0 \\ 0 & 15 & 0 & 0 & 1 & 0 \\ 0 & 0 & 15 & 0 & 0 & 1 \end{bmatrix}$$

Additionally, the $L_\infty$ norm of the regulated output as a function of the control parameter $K_p$, $K_d$ is measured. Additionally, the effectiveness of $L_\infty/L_2$ induced norm as performance analysis means of the controller 10 is analyzed by comparing the measured $L_\infty$ norm $\|z\|\infty$ value of the regulated output with the $L_\infty/L_2$ induced norm value.

Table 1 summarizes the computational results of the above data, and FIGS. 5A-5H is a graph showing a comparison between the target motion trajectory $[q_d^T(t) \ \dot{q}_d^T(t)] \in \mathbb{R}^{2n}$ for each parameter $K_p$, $K_d$ and the tracking motion trajectory $[q_d^T(t) \ \dot{q}^T(t)]^T$ representing the real motion.

Figure 5A:
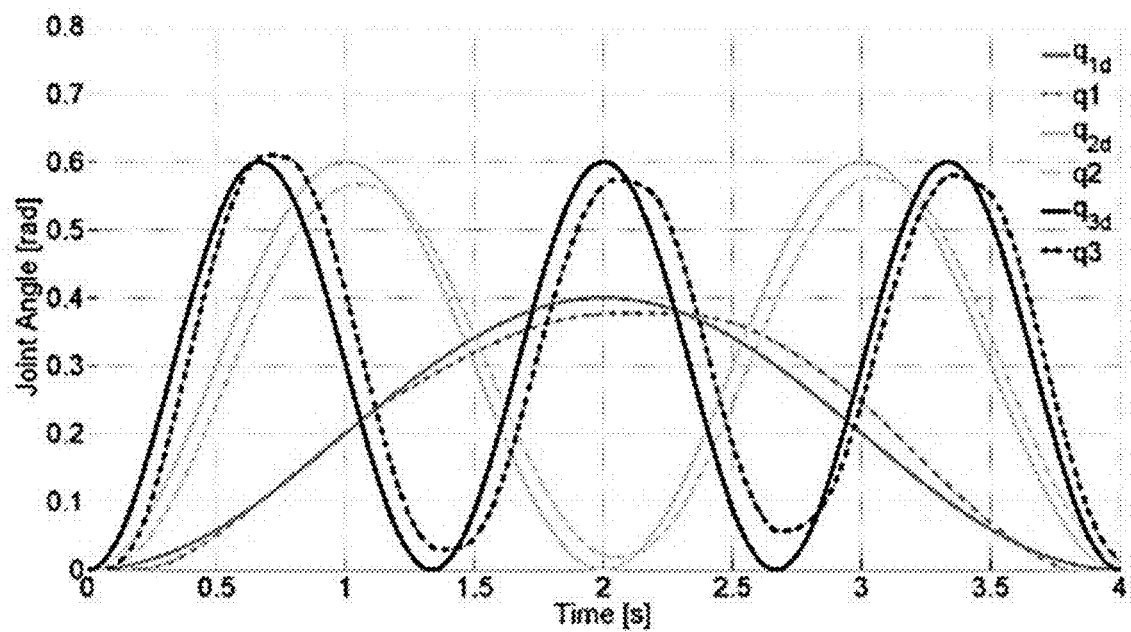
FIGS. 5A-5H is a graph showing a comparison between a target motion trajectory $[q_d^T(t) \; \dot{q}_d^T(t)] \in \mathbb{R}^{2n}$ for each parameter $K_p$, $K_d$ and a tracking motion trajectory $[q_d^T(t) \; \dot{q}_d^T(t)]^T$ representing a real motion.
Figure 5B:
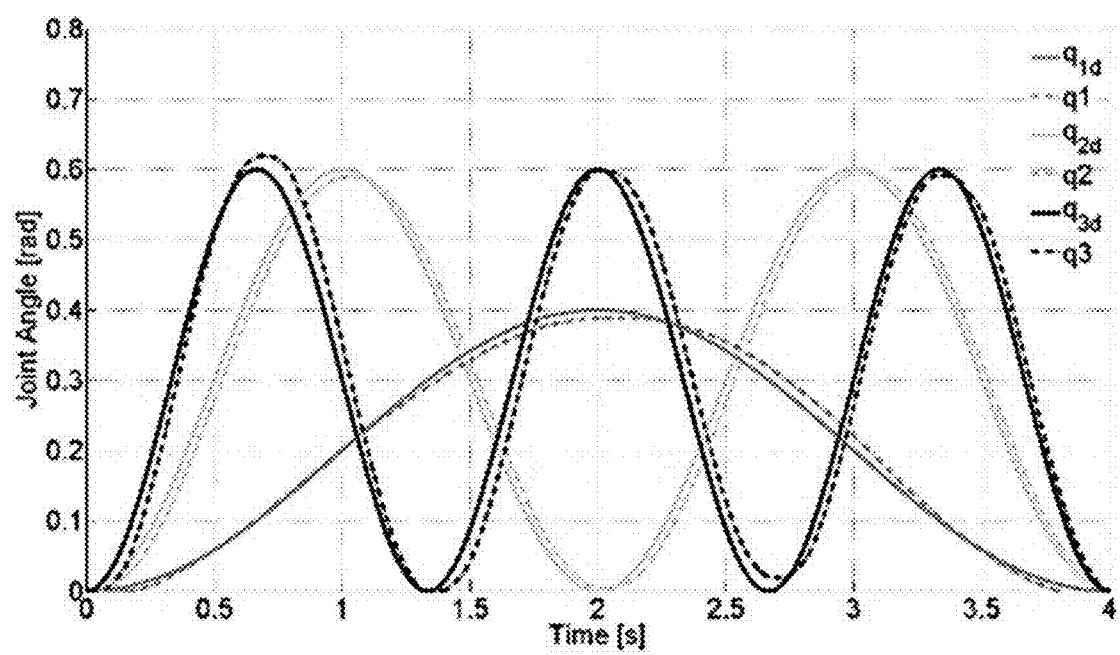
Figure 5C:
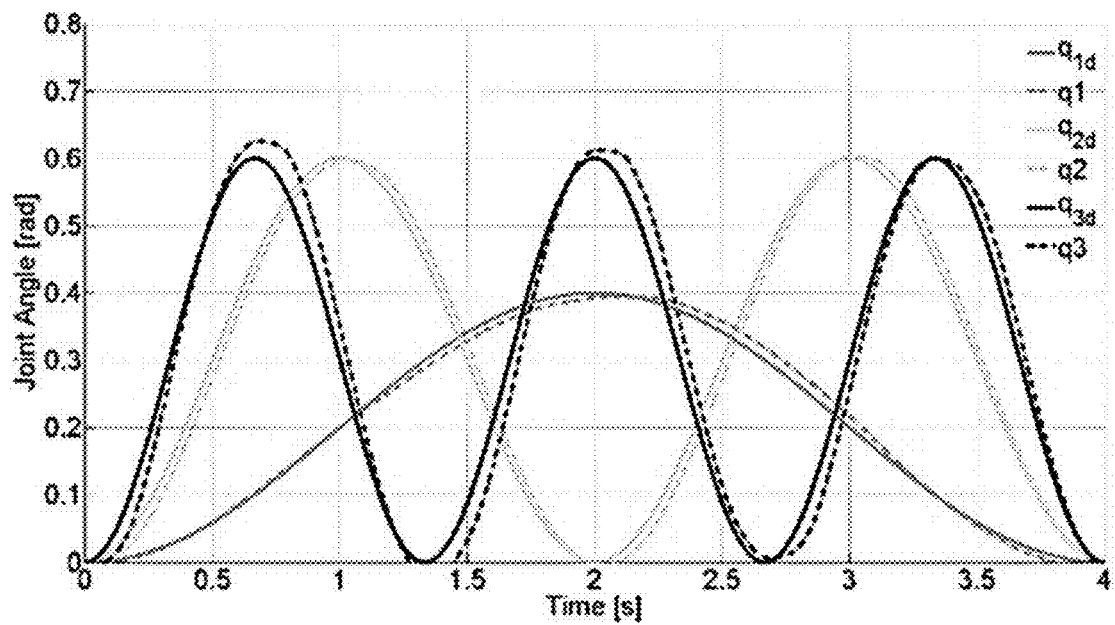
Figure 5D:
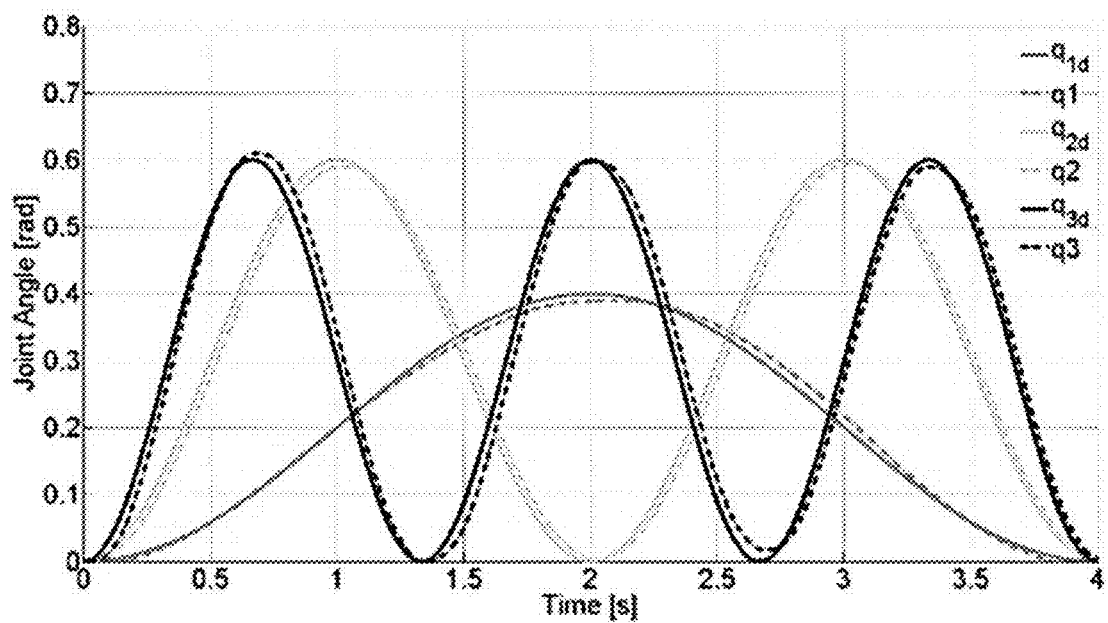
Figure 5E:
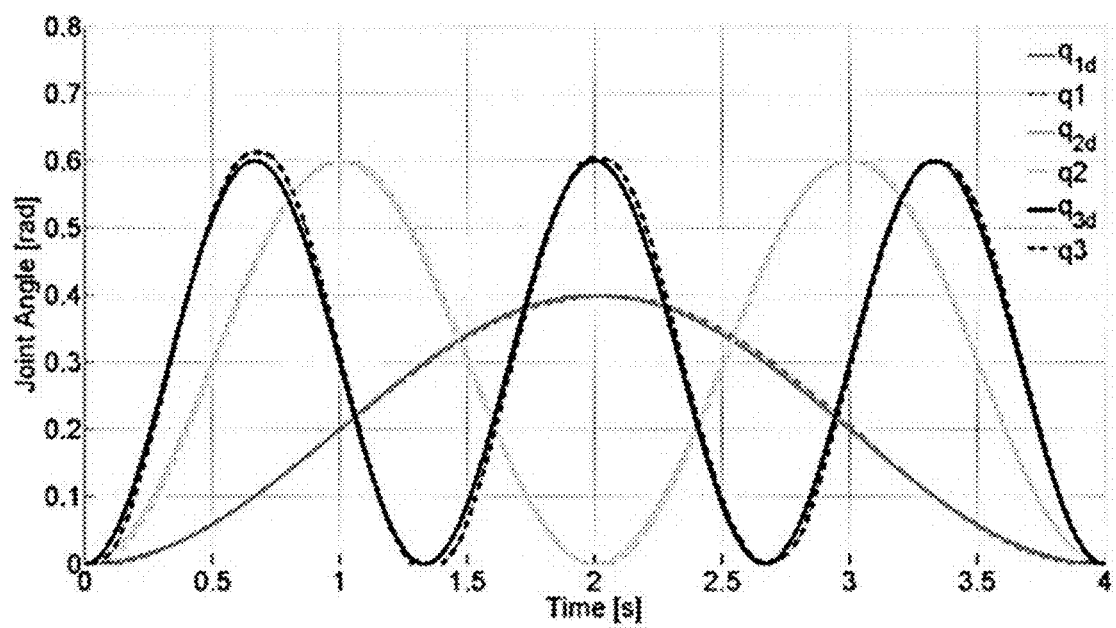
Figure 5F:
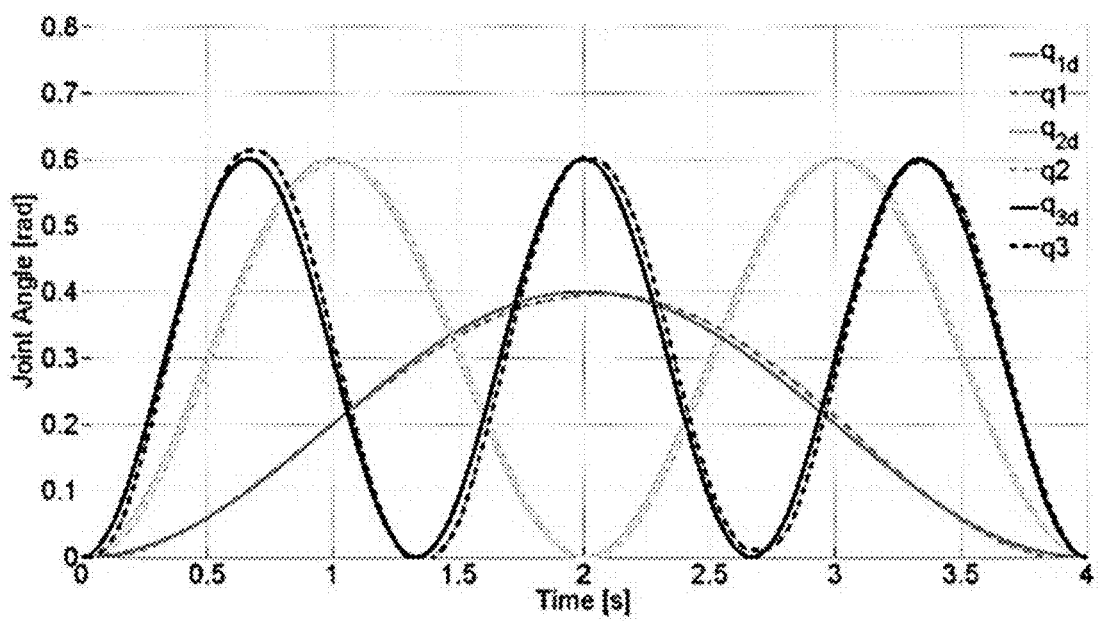
Figure 5G:
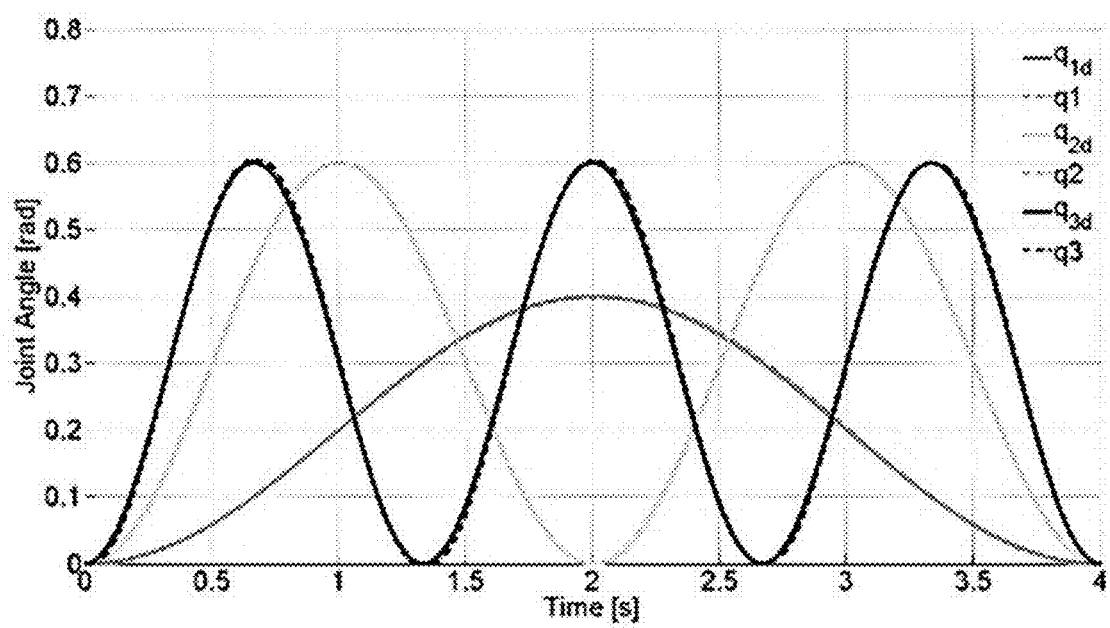
Figure 5H:
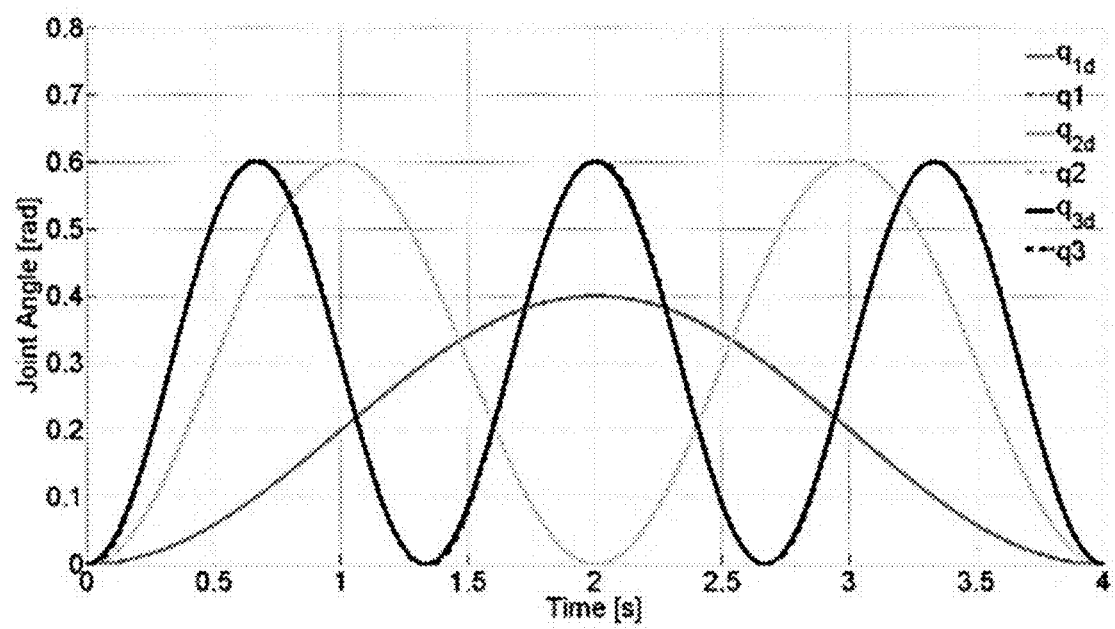

FIG. 5A shows experiment example 1 ($K_p$=30, $K_d$=10), FIG. 5B shows experiment example 2 ($K_p$=70, $K_d$=15), FIG. 5C shows experiment example 3 ($K_p$=90, $K_d$=10), FIG. 5D shows experiment example 4 ($K_p$=80, $K_d$=20), FIG. 5E shows experiment example 5 ($K_p$=120, $K_d$=20), FIG. 5F shows experiment example 6 ($K_p$=200, $K_d$=20), FIG. 5G shows experiment example 7 ($K_p$=400, $K_d$=30), and FIG. 5H shows experiment example 8 ($K_p$=800, $K_d$=40).

TABLE 1

| $(k_p, k_d)$ | (30, 10) | (70, 15) | (90, 10) | (80, 20) |
|---|---|---|---|---|
| $\|Z\|_\infty$ | 2.0155 | 1.2329 | 1.0628 | 0.8540 |
| $\|T\|_{\infty/2}$ | 0.6519 | 0.4183 | 0.3748 | 0.3087 |
| $(k_p, k_d)$ | (120, 20) | (200, 20) | (400, 30) | (800, 40) |
| $\|Z\|_\infty$ | 0.7328 | 0.5538 | 0.3570 | 0.2624 |
| $\|T\|_{\infty/2}$ | 0.2681 | 0.2305 | 0.1614 | 0.1266 |

As shown in FIGS. 5A to 5H, it can be seen that the increasing control parameter $K_p$, $K_d$ increases matching between the target motion trajectory $[q_d^T(t) \ \dot{q}_d^T(t)] \in \mathbb{R}^{2n}$ and the tracking motion trajectory $[q_d^T(t) \ \dot{q}^T(t)]^T$ representing the real motion. It can be seen that when the robot manipulator according to this experiment example is designed with the parameters of high values, motion trajectory tracking is performed effectively and accurately. Although this experiment example shows that with the increasing value of the control parameter $K_p$, $K_d$, the tracking trajectory error reduces, the settings of the control parameter $K_p$, $K_d$ may be different depending on the environment.

Additionally, it can be seen that as matching increases with the increasing parameter value, the value of $L_\infty$ norm of the regulated output stated in Table 1 also gradually reduces. Additionally, it can be seen that with the increasing parameter value, the $L_\infty/L_2$ induced norm also gradually reduces in numerical value. In the above Equation 17, it is predicted that the $L_\infty/L_2$ induced norm and the $L_\infty$ norm of the regulated output would have a positive correlation, and it is found through $\|z\|_\infty$ the experiment that a positive correlation is actually formed. It can be seen that as the $L_\infty/L_2$ induced norm reduces, the $L_\infty$ norm $\|z\|_\infty$ of the regulated output also reduces. The $L_\infty/L_2$ induced norm according to an embodiment of the present disclosure is a criterion for analyzing the performance of the controller 10, and it is possible to reduce the tracking trajectory error as much as desired by adjusting the settings of the parameter $K_p$, $K_d$ to reduce the numerical value of the $L_\infty/L_2$ induced norm.

That is, it is found through the above experiment that the $L_\infty/L_2$ induced norm is eligible for an analysis criterion for analyzing the performance of the controller 10. In addition, the $L_\infty/L_2$ induced norm may have a direct correlation with a numerical value representing the trajectory tracking error.

The controller 10 according to this embodiment can control the control target more accurately and effectively by controlling the control target 20 by PD control combined with a feedback linearization technique including a dynamic property of the control target in an input value to remove nonlinearity.

Additionally, the control parameter K is set, taking into account the relation between the total exogenous disturbance w considering both the exogenous disturbance torque vector and the modeling error and the regulated output z represented as the trajectory tracking error $[e^T \ \dot{e}^T]$, and the control parameter may be determined to reduce the trajectory tracking error as much as desired through a new method for analyzing the quantitative control performance of the controller 10.

Hereinafter, the parameter determination method of the controller according to an embodiment of the present disclosure will be described.

Figure 6:
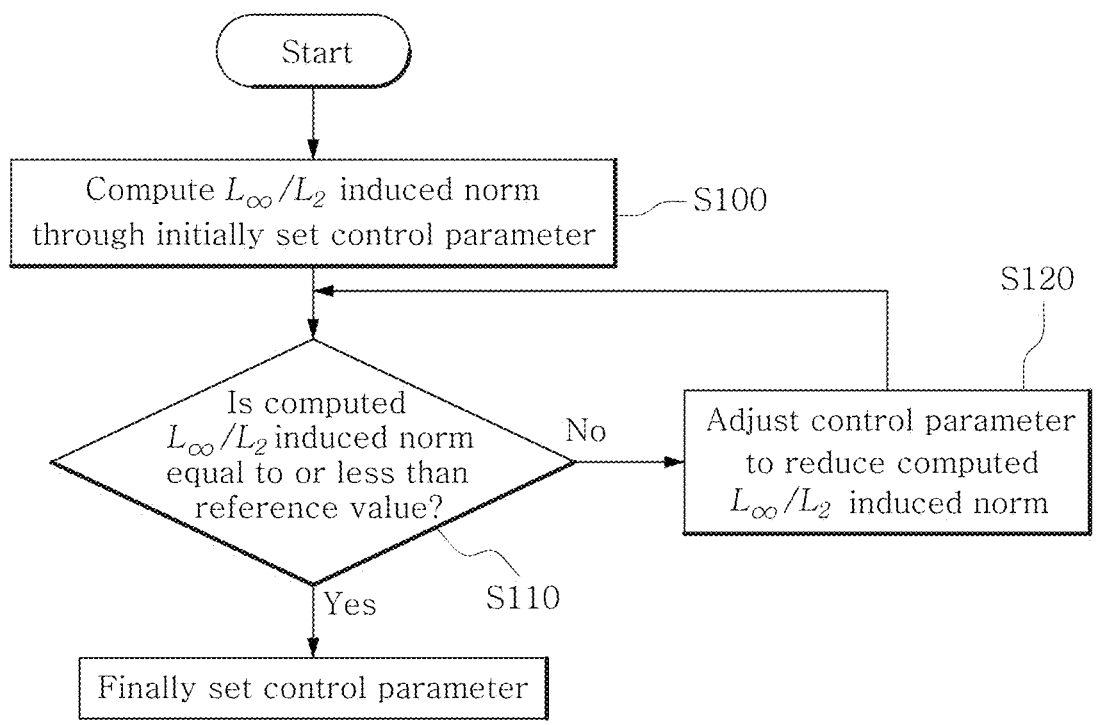
FIG. 6 is a flowchart of a parameter design method of a controller according to an embodiment of the present disclosure.

FIG. 6 is a flowchart of the parameter determination method of the controller according to an embodiment of the present disclosure. The parameter determination method according to this embodiment may be a parameter determination method that is applied to the controller 10 described above in FIGS. 1 to 5H.

The controller 10 is based on computed torque involving computing an error value e of an output value q of the control target 20 for a target value $q_d$ through a preset computational equation and providing a control input value T of the control target 20, K corresponds to a control parameter of the controller 10, and precision and accuracy of trajectory tracking may be determined by the control parameter. Accordingly, the process of setting an appropriate control parameter may be performed before controlling the control target 20 by the controller 10.

Here, the controller 10 includes the inner loop controller 100 and the outer loop controller 110, and the inner loop controller 100 may form an inner loop system with the control target 20. The inner loop system may be represented by a generalized linear model of a continuous-time linear time-invariant system as shown in the following Equation 7, and the outer loop controller 110 may perform PD control as shown in the following Equation 8. Additionally, the controller 10 may form the control system 1 with the control target 20, and this may be a closed loop system $P_K$ as shown in the following Equation 9:

$$P: \begin{cases} \dot{x} = Ax + Bw + Bu \\ z = Cx \\ y = x \end{cases} \quad \text{[Equation 7]}$$

$$u = Ky = Kx = K\begin{bmatrix} e \\ \dot{e} \end{bmatrix} = : -[K_p \ K_d]\begin{bmatrix} e \\ \dot{e} \end{bmatrix} \quad \text{[Equation 8]}$$

-continued $$P_K : \begin{cases} \dot{x} = A_K x + Bw \\ z = Cx \end{cases} \quad \text{[Equation 9]}$$

(where $$A_K \approx A + BK,$$
$$A \approx \begin{bmatrix} 0 & I \\ 0 & 0 \end{bmatrix},$$
$$B \approx \begin{bmatrix} 0 \\ I \end{bmatrix},$$
$$C \approx [C_p \ C_d],$$
$$x \approx [e^T \ \dot{e}^T]^T,$$

K is the control parameter, $w := -M^{-1}(q)\tilde{M}(q)(\ddot{q}_d - u) - M^{-1}(q)*\tilde{C}(q,\dot{q})\dot{q} + \tilde{G}(q) - \tau_d)$ is the total exogenous disturbance w acting in the inner loop system, y is the measured output, and z is the regulated output.)

The $L_\infty/L_2$ induced norm of the controller 10 is computed through an initially set control parameter (S100).

The control parameter K of the controller 10 according to this embodiment may be designed taking into account the total exogenous disturbance w considering both the exogenous disturbance torque vector and the modeling error (nominal error). Here, it is assumed that the total exogenous disturbance w has finite energy.

The performance analysis mathematical expression of the controller 10 according to an embodiment of the present disclosure may have the form of $L_\infty/L_2$ induced norm of the control system. That is, the performance analysis mathematical expression according to this embodiment represents the standard performance from the viewpoint of limitations of time domain, not limitations of frequency domain, and may be substantially a more useful analysis criterion. Additionally, as demonstrated by the above experiment, the $L_\infty/L_2$ induced norm of the control system may have a positive correlation with the $L_\infty$ norm $\|z\|_\infty$ of the regulated output represented as the trajectory tracking error. That is, the $L_\infty/L_2$ induced norm may be an analysis mathematical expression that directly reflects the trajectory tracking error, and determination of the current performance of the controller 10 based on this may be more direct and effective than other analysis means.

The $L_\infty/L_2$ induced norm of the closed loop system may be computed through the performance analysis mathematical expression $d_{max}^{1/2}(OPC^T)$. Here, P is the solution of $A_K P + P A_K^T + BB^T = 0$.

The control parameter K the controller 10 according to this embodiment may have an initially set value. The control parameter $K_P$, $K_d$ may be the following positive definite matrix.

$$K_P = \begin{bmatrix} k_p & 0 & 0 \\ 0 & k_p & 0 \\ 0 & 0 & k_p \end{bmatrix},$$

$$K_d = \begin{bmatrix} k_d & 0 & 0 \\ 0 & k_d & 0 \\ 0 & 0 & k_d \end{bmatrix}$$

The tracking motion trajectory of the control target is generated by setting the dynamics equation of the closed loop system through the initially set control parameter $K_P$, $K_d$, and the trajectory tracking $[e^T \ \dot{e}^T]$ error appearing between the target motion trajectory $[q_d^T(t) \ \dot{q}_d^T(t)] \in \mathbb{R}^{2n}$ and the tracking motion trajectory $[q_d^T(t) \ \dot{q}^T(t)]^T$ representing the real motion is computed. The $L_\infty/L_2$ induced norm of the closed loop system is computed by substituting the computed information into the performance analysis mathematical expression $d_{max}^{1/2}(CPC^T)$.

The computed $L_\infty/L_2$ induced norm is compared with the reference value (S110).

The predefined reference value is a value that is preset by considering the total exogenous disturbance w and the trajectory tracking error e, and may be a numerical value that guarantees effective and accurate motion trajectory tracking of the control target 20 performed according to the control value of the controller 10. The computed $L_\infty/L_2$ induced norm is compared with the reference value. When the computed induced norm $L_\infty/L_2$ is equal to or less than the reference value, it may be determined that the controller 10 in the present state is ready for effective motion trajectory tracking. That is, the controller 10 has the performance set to be optimal, so it is determined that the control target 20 can be controlled to accurately follow a target motion, and thus the initially set control parameter K may be finally set as it is. That is, the following step may not be performed, and the controller 10 may control the control target 20 based on the finally set control parameter K. As opposed to this, when the computed $L_\infty/L_2$ induced norm exceeds the reference value, the process of adjusting the control parameter K is performed.

The control parameter is adjusted to reduce the computed $L_\infty/L_2$ induced norm (S120).

The control parameter K is adjusted such that it is smaller than the reference value. Here, the control parameter may be estimated such that its value increases, and the value of the $L_\infty/L_2$ induced norm computed through the newly estimated control parameter may be smaller than the earlier value. However, the present disclosure is not limited thereto, and in other embodiment, the control parameter may be estimated such that its value reduces, and the value of the $L_\infty/L_2$ induced norm computed through the newly estimated control parameter may be smaller than the earlier value.

Subsequently, the step of comparing the $L_\infty/L_2$ induced norm computed through the newly estimated control parameter with the reference value may be performed again. Here, when the $L_\infty/L_2$ induced norm exceeds the reference value again, the above-described process of adjusting the control parameter may be performed again. That is, in the control parameter design method according to an embodiment of the present disclosure, the step of comparing the computed $L_\infty/L_2$ induced norm with the reference value (S110) and the step of adjusting the control parameter (S120) may be repeated until the computed $L_\infty/L_2$ induced norm is equal to or less than the reference value.

Hereinafter, a parameter analysis method of a controller according to another embodiment of the present disclosure will be described.

Figure 7:
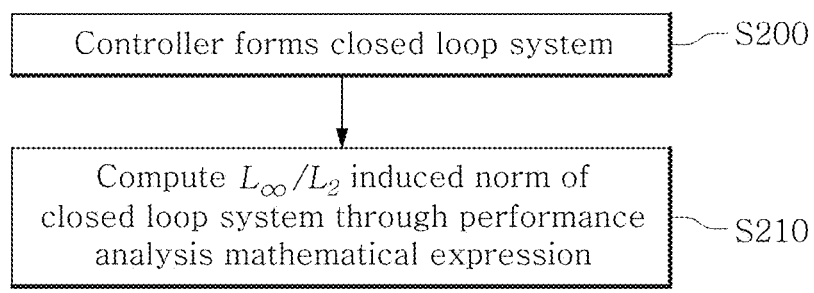
FIG. 7 is a flowchart of a parameter analysis method of a controller according to another embodiment of the present disclosure.

FIG. 7 is a flowchart of a parameter analysis method of a controller according to another embodiment of the present disclosure.

This embodiment provides a performance analysis method of a controller that computes an error value of an output value of a control target for a target value through a computational equation and provides a control input value of the control target, and the controller may be the controller 10 described in FIGS. 1 to 5H.

First, the controller forms a closed loop system $P_K$ as shown in the above Equation 9 (S200).

The controller 10 includes an inner loop controller 100 and an outer loop controller 110, and the inner loop controller 100 may form an inner loop system with a control target 20. The inner loop system is represented by a generalized linear model of a continuous-time linear time-invariant system as shown in the above Equation 7, and the outer loop controller 110 may perform PD control as shown in the above Equation 8. Additionally, the controller 10 may form a control system 1 with the control target 20, and this may be a closed loop system $P_K$ as shown in the above Equation 9.

Subsequently, $L_\infty/L_2$ induced norm of the closed loop system is computed through a performance analysis mathematical expression $d_{max}^{1/2}(CPC^T)$ (S210).

The control parameter K of the controller 10 according to this embodiment may be designed taking into account the total exogenous disturbance w considering both the exogenous disturbance torque vector and the modeling error (nominal error). Here, it is assumed that the total exogenous disturbance w has finite energy.

The performance analysis mathematical expression of the controller 10 according to an embodiment of the present disclosure may have the form of $L_\infty/L_2$ induced norm of the control system. That is, the performance analysis mathematical expression according to this embodiment represents the standard performance from the viewpoint of limitations of time domain, not limitations of frequency domain, and may be substantially a more useful analysis criterion. Additionally, as demonstrated by the above experiment, the $L_\infty/L_2$ induced norm of the control system may have a positive correlation with $L_\infty$ norm $\|z\|_\infty$ of regulated output represented as a trajectory tracking error. That is, the $L_\infty/L_2$ induced norm may be an analysis mathematical expression that directly reflects a trajectory tracking error, and determination of the current performance of the controller 10 based on this may be more direct and effective than other analysis means.

The $L_\infty/L_2$ induced norm of the closed loop system may be computed through the performance analysis mathematical expression $d_{max}^{1/2}(CPC^T)$. Here, P is the solution of $A_K P + P A_K^T + B B^T = 0$.

The control parameter K of the controller 10 according to this embodiment may have an initially set value. The control parameter $K_P$, $K_d$ may be the following positive definite matrix.

$$K_p = \begin{bmatrix} k_p & 0 & 0 \\ 0 & k_p & 0 \\ 0 & 0 & k_p \end{bmatrix},$$

$$K_d = \begin{bmatrix} k_d & 0 & 0 \\ 0 & k_d & 0 \\ 0 & 0 & k_d \end{bmatrix}$$

A tracking motion trajectory of the control target is generated by setting the dynamics equation of the closed loop system through the initially set control parameter $K_P$, $K_d$, and a trajectory tracking error $[e^T \; \dot{e}^T]$ appearing between the target motion trajectory $[q_d^T(t) \; \dot{q}_d^T(t)] \in \mathbb{R}^{2n}$ and the tracking motion trajectory $[q_d^T(t) \; \dot{q}^T(t)]^T$ representing the real motion is computed. The $L_\infty/L_2$ induced norm of the closed loop system is computed by substituting the computed information into the performance analysis mathematical expression $d_{max}^{1/2}(CPC^T)$ and the performance analysis of the controller 10 is performed based on the $L_\infty/L_2$ induced norm of the closed loop system.

The operation by the parameter determination method of the controller and the performance analysis method of the controller according to the embodiments as described above may be implemented as a computer program and recorded on a computer-readable recording media at least in part. The computer-readable recording medium having recorded thereon the program for implementing the operation by the parameter determination method of the controller and the performance analysis method of the controller according to the embodiments includes any type of recording device in which computer-readable data is stored. Examples of the computer-readable recording media include ROM, RAM, CD-ROM, magnetic tape, floppy disk, and optical data storing devices. Additionally, the computer-readable recording media is distributed over computer systems connected via a network so that computer-readable codes may be stored and executed in distributed manner. Additionally, functional programs, codes and code segments for realizing this embodiment will be easily understood by those having ordinary skill in the technical field to which this embodiment belongs.

The present disclosure has been hereinabove described with reference to the embodiments, but the present disclosure should not be interpreted as being limited to these embodiments or drawings, and it will be apparent to those skilled in the corresponding technical field that modifications and changes may be made thereto without departing from the spirit and scope of the present disclosure set forth in the appended claims.

What is claimed is:

1. A controller that computes an error value of an output value of a control target for a target value through a computational equation and provides a control input value of the control target, the controller comprising:
    an outer loop controller which constitutes closed loop control of the control target, and an inner loop controller which performs feedback linearization to remove nonlinearity of the control target,
    wherein a dynamics equation of the control target is represented by the following Equation 1 including an exogenous disturbance torque vector, and
    the inner loop controller and the control target form an inner loop system, and a dynamics equation for a trajectory tracking error of the inner loop system is represented by the following Equation 4:

$$M(q)\ddot{q} + C(q,\dot{q})\dot{q} + G(q) + \tau_d = \tau \quad \text{[Equation 1]}$$

where $q(t) \in \mathbb{R}^n$ is the output value and corresponds to a joint angle vector, $M(q) \in \mathbb{R}^{n \times n}$ corresponds to a positive definite matrix corresponding to Inertia, $C(q,\dot{q})\dot{q} \in \mathbb{R}^n$ corresponds to a Coriolis and centrifugal torque vector, $G(q) \in \mathbb{R}^n$ corresponds to a gravitational torque vector, $\tau_d(t) \in \mathbb{R}^n$ corresponds to the exogenous disturbance torque vector, $\tau(t) \in \mathbb{R}^n$ corresponds to a control input torque vector, $$\ddot{e} = w + u \quad \text{[Equation 4]}$$

where $w := -M^{-1}(q)\tilde{M}(q)(\ddot{q}_d - u) - M^{-1}(q)(\tilde{C}(q,\dot{q})\dot{q} + \tilde{G}(q) - \tau_d)$ is a total exogenous disturbance acting in the inner loop system, and is defined as including both the exogenous disturbance torque vector and a computational error, and u is a control output value that is provided to the inner loop system by the outer loop controller, and wherein the controller controls a robot manipulator based on operations of the outer loop controller and the inner loop system, wherein the inner loop system is represented by a generalized linear model of a continuous-time linear time-invariant system as shown in the following Equation 7, the outer loop controller performs proportional derivative (PD) control as shown in the following Equation 8, and a closed loop system implemented by the controller is represented by the following Equation 9:

$$P: \begin{cases} \dot{x} = Ax + Bw + Bu \\ z = Cx \\ y = x \end{cases} \quad [\text{Equation 7}]$$

where $$A \approx \begin{bmatrix} 0 & I \\ 0 & 0 \end{bmatrix},$$

$$B \approx \begin{bmatrix} 0 \\ I \end{bmatrix},$$

$$C \approx [C_p \ C_d],$$

$$x \approx [e^T \ \dot{e}^T]^T,$$

y denotes a measured output, and z denotes a regulated output, $$u = Ky = Kx = K\begin{bmatrix} e \\ \dot{e} \end{bmatrix} = :-[K_p \ K_d]\begin{bmatrix} e \\ \dot{e} \end{bmatrix} \quad [\text{Equation 8}]$$

$$P_K: \begin{cases} \dot{x} = A_K x + Bw \\ z = Cx \end{cases} \quad [\text{Equation 9}]$$

where $A_K := A+BK$, K is a control parameter, and wherein the $L_\infty/L_2$ induced norm of the closed loop system is computed by the following Equation 16:

$$\|T\|_{\infty/2} = \max_{1 \le i \le n}(C_i P C_i^T) = d_{max}^{1/2}(CPC^T) \quad [\text{Equation 16}]$$

where P is a solution of $A_K P + P A_K^T + BB^T = 0$.

2. The controller according to claim 1, wherein based on an energy of the total exogenous disturbance w, an $L_\infty/L_2$ induced norm of the closed loop system and an $L_\infty$ norm $\|x\|_\infty$ of the regulated output z have a positive correlation.

3. A parameter determination method of a controller that computes an error value of an output value of a control target for a target value through a computational equation and provides a control input value of the control target, wherein the controller forms a closed loop system $P_K$ as shown in the following Equation 9:

$$P_K: \begin{cases} \dot{x} = A_K x + Bw \\ z = Cx \end{cases} \quad [\text{Equation 9}]$$

where $$A_K \approx A + BK,$$

$$A \approx \begin{bmatrix} 0 & I \\ 0 & 0 \end{bmatrix},$$

$$B \approx \begin{bmatrix} 0 \\ I \end{bmatrix},$$

$$C \approx [C_p \ C_d],$$

$$x \approx [e^T \ \dot{e}^T]^T,$$

K denotes the control parameter, $w := -M^{-1}(q)\tilde{M}(q)(\ddot{q}_d - u) - M^{-1}(q)(\tilde{C}(q,\dot{q})\dot{q} + \tilde{G}(q) - \tau_d)$ is a total exogenous disturbance acting in an inner loop system and is defined as including both an exogenous disturbance torque vector and a computation error, and z denotes a regulated output, the parameter determination method comprising:

computing an $L_\infty/L_2$ induced norm of a control system formed by the controller and the control target through an initially set control parameter;

comparing the computed $L_\infty/L_2$ induced norm with a reference value;

when the computed $L_\infty/L_2$ induced norm is larger than the reference value, adjusting the control parameter to reduce the computed $L_\infty/L_2$ induced norm; and controlling a robot manipulator based on the computing and the comparing;

wherein the $L_\infty/L_2$ induced norm of the closed loop system is computed through a performance analysis mathematical expression $d_{max}^{1/2}(CPC^T)$ where P is a solution of $A_K P + P A_K^T + BB^T = 0$.

4. The parameter determination method of a controller according to claim 3, wherein based on an energy of the total exogenous disturbance w, the $L_\infty/L_2$ induced norm of the closed loop system and the $L_\infty$ norm $\|z\|_\infty$ of the regulated output z have a positive correlation.

5. A performance analysis method of a controller that computes an error value of an output value of a control target for a target value through a computational equation and provides a control input value of the control target, the performance analysis method comprising:

the controller forming a closed loop system $P_K$ as shown in the following Equation 9; and computing an $L_\infty/L_2$ induced norm of the closed loop system through a performance analysis mathematical expression $d_{max}^{1/2}(CPC^T)$:

$$P_K: \begin{cases} \dot{x} = A_K x + Bw \\ z = Cx \end{cases} \quad \text{[Equation 9]}$$

where $A_K \approx A + BK$, $A \approx \begin{bmatrix} 0 & I \\ 0 & 0 \end{bmatrix}$, $B \approx \begin{bmatrix} 0 \\ I \end{bmatrix}$, $C \approx [C_p \ C_d]$, $x \approx [e^T \ \dot{e}^T]^T$, K is a control parameter, $w := -M^{-1}(q)\tilde{M}(q)(\ddot{q}_d - u) - M^{-1}(q)*\tilde{C}(q,\dot{q})\dot{q} + \tilde{G}(q) - \tau_d)$ is a total exogenous disturbance acting in an inner loop system and is defined as including both an exogenous disturbance torque vector and a computational error, z denotes a regulated output, and P is a solution of $A_K P + PA_K^T + BB^T = 0$;

controlling a robot manipulator based on the computing.

* * * * *